United States Patent [19]

Pricone et al.

[11] Patent Number: 4,478,769

[45] Date of Patent: Oct. 23, 1984

[54] METHOD FOR FORMING AN EMBOSSING TOOL WITH AN OPTICALLY PRECISE PATTERN

[75] Inventors: Robert M. Pricone, Vernon Hills; Anthony J. Montalbano, Lake Barrington Shores, both of Ill.

[73] Assignee: Amerace Corporation, New York, N.Y.

[21] Appl. No.: 430,866

[22] Filed: Sep. 30, 1982

[51] Int. Cl.³ .............................................. B29D 11/00
[52] U.S. Cl. .................................. 264/1.6; 204/4; 204/9; 264/1.9; 264/2.5; 264/2.7; 264/220; 264/227; 264/335; 425/385; 425/437
[58] Field of Search ............... 204/4, 9; 264/1.6, 1.9, 264/2.5, 2.7, 159, 220, 227; 425/385

[56] References Cited

U.S. PATENT DOCUMENTS

| | | | |
|---|---|---|---|
| 1,845,052 | 2/1932 | Laukel | 204/4 |
| 3,520,967 | 7/1970 | Kreier | 264/227 |
| 3,565,978 | 2/1971 | Folger et al. | 264/2.5 |
| 3,671,405 | 6/1972 | Mattia | 204/4 |
| 3,712,706 | 1/1973 | Stamm | 350/103 |
| 3,809,642 | 5/1974 | Bond et al. | 204/4 |
| 3,935,359 | 1/1976 | Rowland | 428/172 |
| 4,243,618 | 1/1981 | Van Arnam | 264/220 |

FOREIGN PATENT DOCUMENTS 55-121011 9/1980 Japan .

Primary Examiner—James Lowe
Assistant Examiner—V. Fischbach
Attorney, Agent, or Firm—David Teschner; Ronald A. Sandler

[57] ABSTRACT

Cylindrical embossing tools are constructed from one or more masters formed by accurately scribing the face of a substrate along three axes in the face to produce a pattern of tetrahedrons. The plurality of masters, or replicated copies made from a single master, are assembled in a fixture and seamless copies are made by electrodeposition of nickel using various shielding and grinding methods to provide replicated copies of uniform thickness. The replicated copies are assembled and used to form larger electroforms until a generally cylindrical embossing tool of the correct width and circumference is created. Novel processes and apparatus are provided for removing the electroformed cylindrical tool from its mother cylinder.

23 Claims, 18 Drawing Figures

FIG. 4
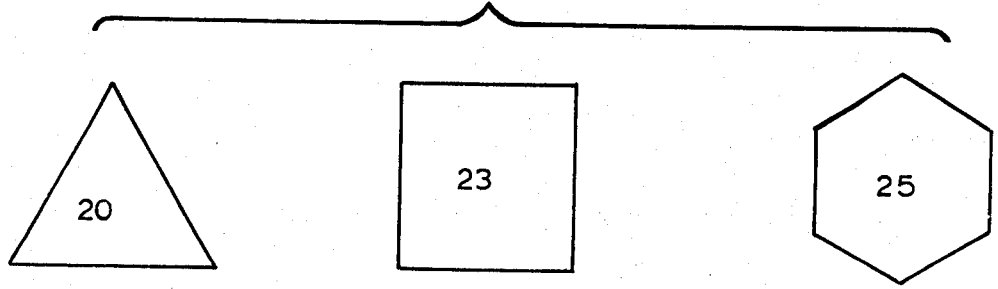
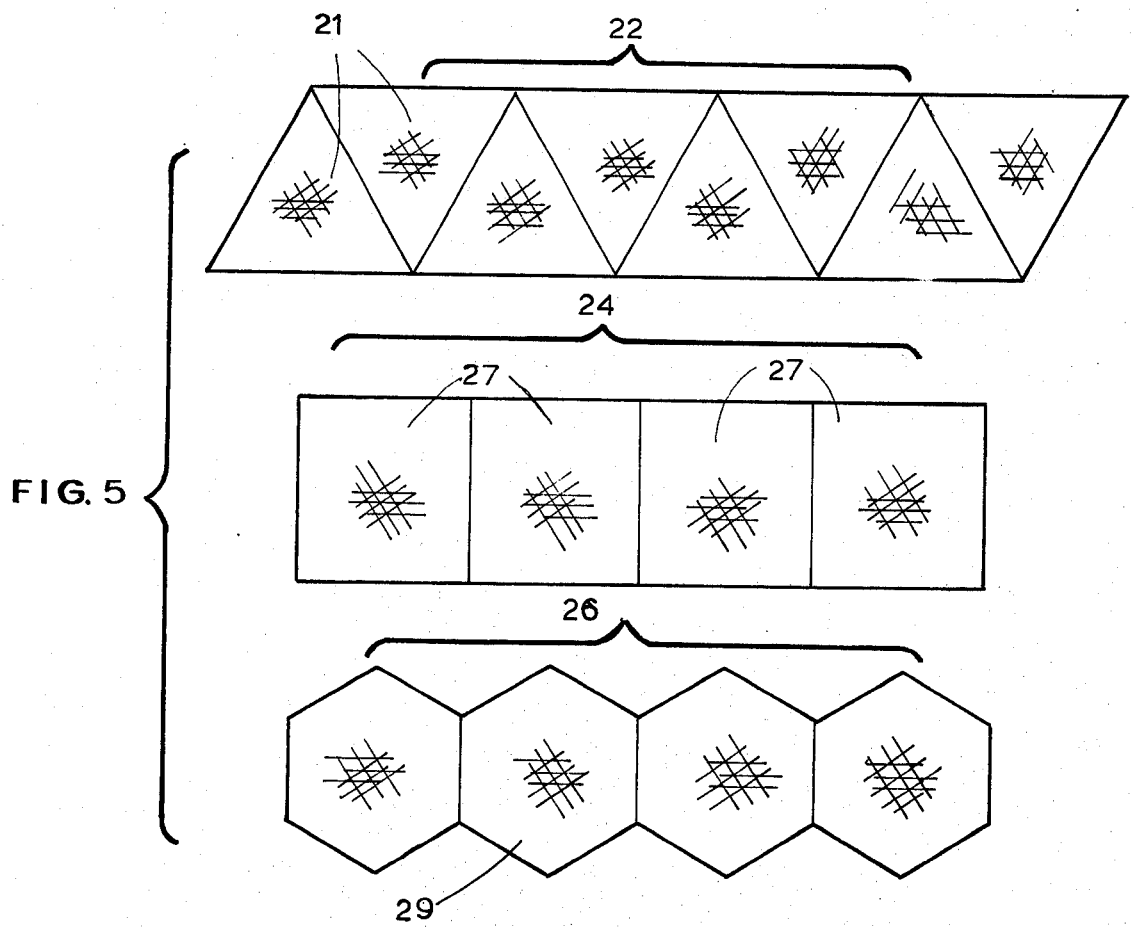
FIG. 5
FIG. 6
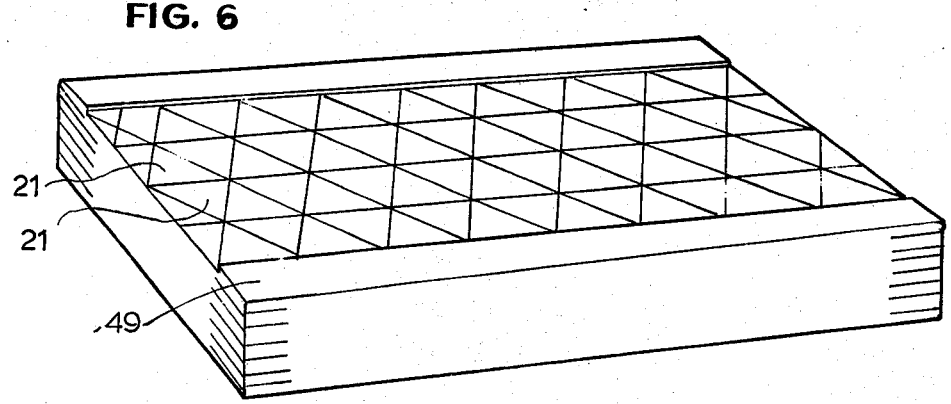

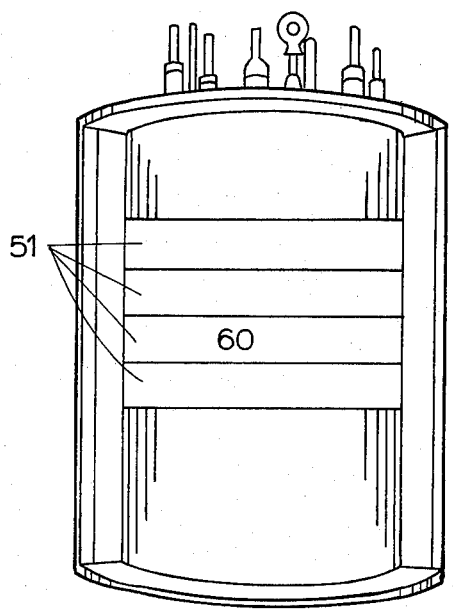
FIG. 8
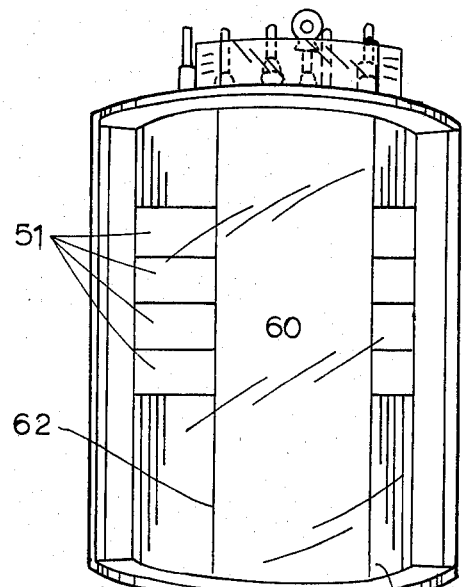
FIG. 10
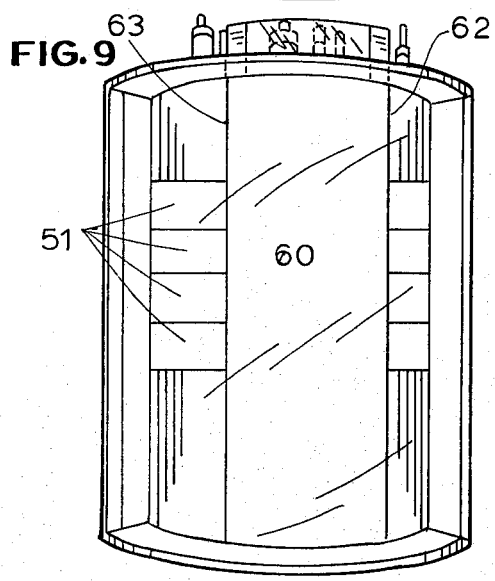
FIG. 9
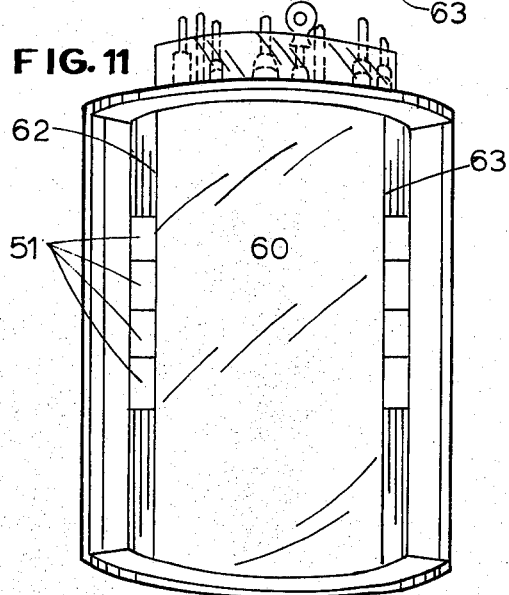
FIG. 11
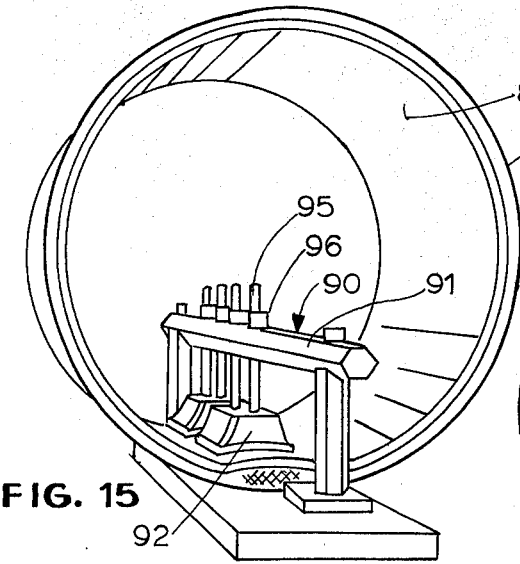
FIG. 15
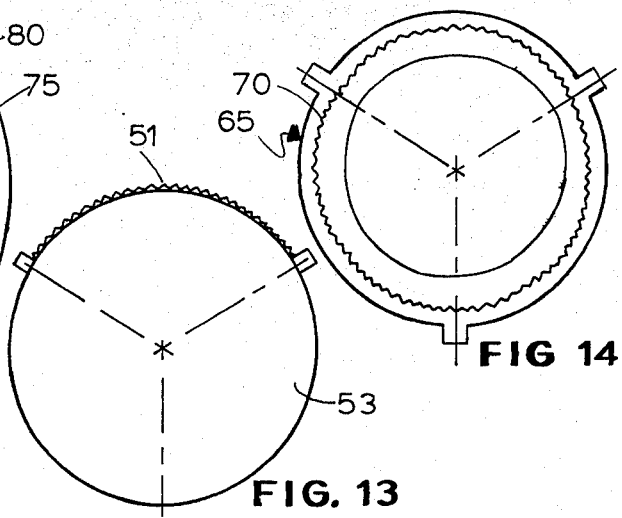
FIG. 13
FIG. 14

METHOD FOR FORMING AN EMBOSSING TOOL WITH AN OPTICALLY PRECISE PATTERN

CROSS-REFERENCE TO RELATED APPLICATION

Method and Apparatus for Producing Embossed Sheeting, by Robert M. Pricone and Sidney A. Heenan, Application Serial No. 06/430,860, filed on even date herewith and assigned to applicant's assignee.

BACKGROUND OF THE INVENTION

1. Field of the Invention

The invention is directed to the field of continuous embossing of sheeting or webs and more particularly to methods and apparatus of producing large scale, flexible, and generally cylindrical embossing tools to emboss continuous plastic webs or the like with a highly accurate pattern of cube-corners useful in the manufacture of retroreflective sheeting.

2. Description of the Prior Art

Some presently employed techniques for the production of retroreflective sheeting include the casting of cube corners on cylindrical drums, followed by an application of secondary material, whereby the cube corner elements are adhered to a different back-up material. (e.g., Rowland U.S. Pat. No. 3,935,359).

Sequential embossing of cube corner type sheeting material has been suggested by using a series of tooled plates and molds. The web of material is embossed on one stroke of the press and then indexed to the next station for a further pressing operation (Rowland U.S. Pat. No. 4,244,683). This process, while operating on a continuous strip of material, is only sequential in nature and has all of the economic and manufacturing deficiencies inherent in such a process. Moreover, to be economically feasible, the width of film or sheeting to be produced, such as 48", requires extensive mold handling capability not contemplated by the Rowland '683 structure and process.

Small, rigid cylindrical rolls also are available for the general continuous embossing of webs of sheet material but, because of the high degree of optical accuracy required in reproducing cube corner elements, this technique has not been used to produce continuous sheeting. Continuous belt type embossing tools also have been disclosed for embossing non-optically critical patterns in thermoplastic or other materials, such as shown in Bussey et al, No. 3,966,383. It also is well known in the cube-corner reflector art to use electroformed tools for producing mold elements. However, the relatively small area encompassed by the typical reflective area permits the easy separation of the electroformed part from its "master" or from pins. To produce a tool required to emboss large areas of sheet, it would be possible to assemble larger and longer groups of masters, but minute seams would be found at the junction lines. Those seams in a final tool could produce stress risers, flash or fins, leaving the assembled tool with possible fatigue areas. In accordance with the present invention, the pieces are reproduced by eliminating the "fin" or seam and then by producing a cylindrical mother and electroforming internally of the tool mother. A problem then encountered is the removal of the cylindrical electroformed tool from the tool mother because of the very accurate but tightly interfitting male and female faces. The present invention discloses techniques and apparatus for producing a cylindrical embossing a tool by electroforms; and a method of separating the finished tool from the cylindrical tool mother.

SUMMARY OF THE INVENTION

The present invention overcomes the difficulties noted with respect to prior art embossing tools by providing methods and apparatus for making large scale, flexible, generally cylindrical embossing tools for embossing highly accurate cube corner or other types of patterns requiring extremely accurate precision formations continuously upon a moving web of plastic or other suitable material.

One or more highly accurate optical quality master elements is cut into suitable substrates. Each master consists of a precision pattern which, in the specific disclosed embodiment, may take the form of tetrahedrons or the like formed when three series of parallel grooves are scribed into the substrate along each of three axes, each axis being spaced from the other two by 120°. Each master element has a series of marginal edges of a geometric figure, such as a triangle, rectangle, square, hexagon, etc. so that the masters can be placed in an abutting contiguous relationship without any gaps therebetween. The masters (or copies of the master) are combined in a cluster to provide a desired pattern in a fixture, and an electroform strip is made of the cluster. The electroformed strip is thin and flexible and with a proper support could itself be used directly as an embossing or compression molding tool but in a non-continuous manner, such as the sequential type embossing disclosed in Rowland U.S. Pat. No. 4,244,683.

Alternately, a number of electroform copies can be made from a single master and these copies combined as a desired cluster in a fixture and an electroform strip made of such copies. This electroform strip also can be used as an embossing tool or in compression molding. In order economically to provide a continuous sheet of material, it is desirable to continuously emboss the thermoplastic substrate without indexing a plurality of molds. Method and apparatus for accomplishing this is disclosed in copending application Ser. No. 06/430,860. That apparatus may utilize a tool of the type produced by the present invention, in which the tool pattern may be at least 48" wide and have a total circumference of 115".

When producing cube-corner sheeting, the high optical quality of the master required, permits only a relatively small master to be produced, such as 5" on a side. Accordingly, to produce an embossing tool of sufficient size to permit embossing of wide webs from the electroform produced from the electroform copy of the masters or the electroform copy of the copies of the ruled master, it is necessary to duplicate and enlarge the copies until a tool of the desired size is achieved.

It therefore is an object of the present invention to produce an improved embossing tool including novel techniques for assuring accuracy of the tool master.

It is another object of the invention to produce an embossing tool large enough to continuously emboss a wide web of material.

It is another object of this invention to produce a large scale, flexible, generally cylindrical embossing tool.

It is yet a further object of this invention to provide a novel method to produce an improved embossing tool for embossing cube-corner sheeting.

It is another object of the invention to provide a novel method of producing a large scale, flexible, seamless cylindrical embossing tool employing a plurality of individually formed masters, replicating such masters and through successive combination and replication of such masters and the resultant copies, produce such an embossing tool.

A further object of the invention is to provide a novel method of producing a large scale, flexible, seamless cylindrical embossing tool employing a single master, replicating and combining such and resultant copies to produce such embossing tool, and a method of separating such large tool from a cylindrical tool mother.

Other objects and features of the invention will be pointed out in the following description and claims and illustrated in the accompanying drawings which disclose, by way of example, the principles of the invention and the best modes which have been contemplated for carrying them out.

BRIEF DESCRIPTION OF THE DRAWINGS

In the drawings in which similar elements are given similar reference characters:

FIG. 4 is a top plan view of a series of blank elements having different geometric shapes suitable for use as masters in accordance with the method of the invention.

FIG. 5 is a top plan view of the ruled masters formed of the blanks of FIG. 4, indicating how each of the respective types of ruled masters can be organized into a cluster with like masters to provide contiguous and continuous surfaces without gaps therebetween.

FIG. 6 is a perspective representation of the manner in which triangular masters of the type shown in FIG. 5 can be organized to permit the production of electroform copies of a ruled master.

FIGS. 8 to 11 show the progressive positions and size of a shield used during the electroforming creation of the semi-cylindrical segment copies.

FIG. 13 is a schematic representation of the arrangement of the semi-cylindrical segment copies into a complete cylinder.

FIG. 14 is a schematic representation of the cylinder produced by the semi-cylindrical segment copies.

FIG. 15 is a front perspective view of a suction tool used to remove a completed cylindrical embossing tool from its mother.

DESCRIPTION OF THE REFERRED EMBODIMENTS

Figure 1:
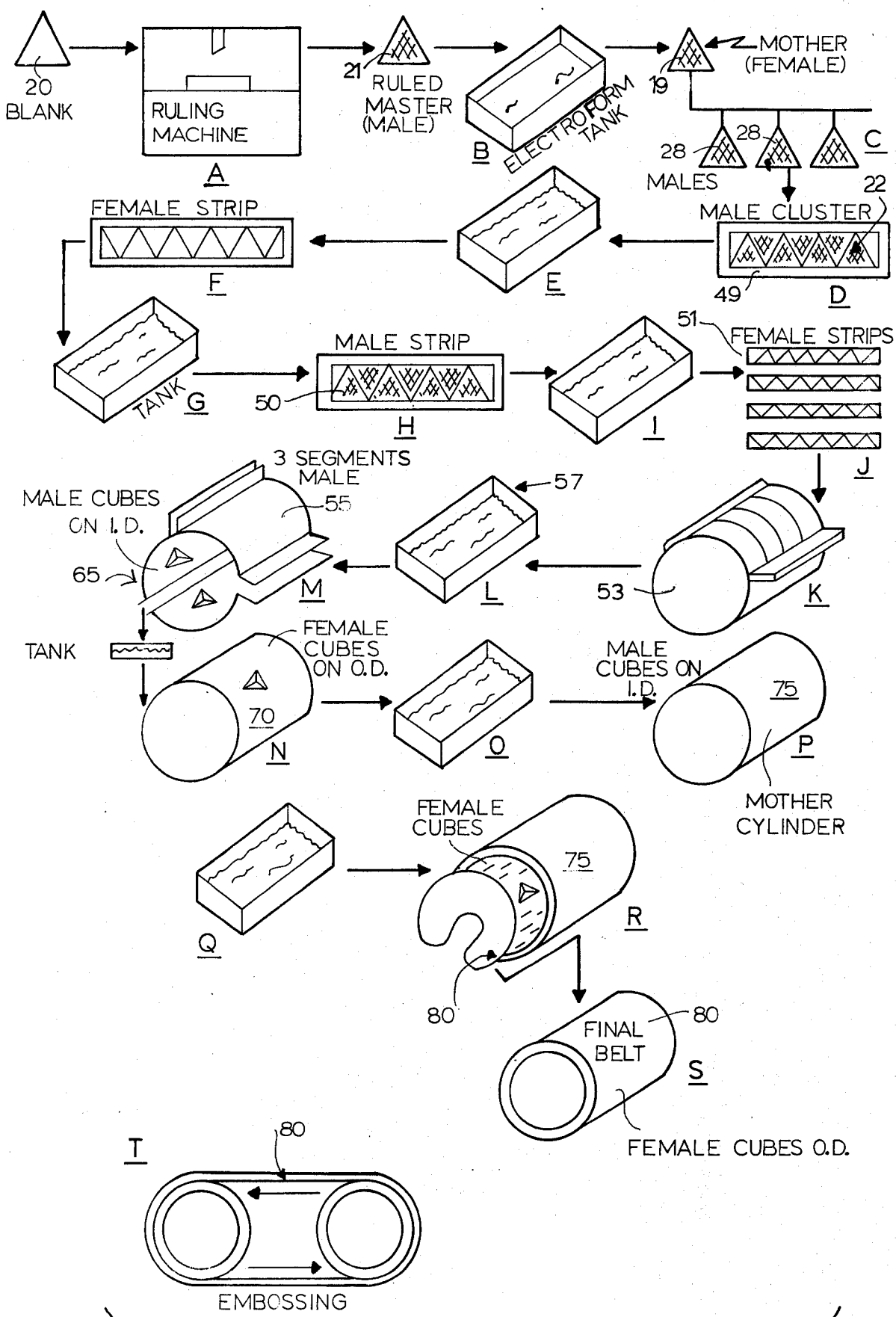
FIG. 1 is a diagrammatic flow chart illustrating the various steps in producing a cylindrical embossing tool in accordance with the present invention.

Turning now to FIGS. 1 to 5, there are shown various aspects of a blank element which is the basic building element for producing large scale, flexible, seamless cylindrical embossing tools according to the process of the present invention. The overall length and width of the element which becomes the ruled master usually is determined by the type of ruling device used to cut the master, and the element may be on the order of one to seven inches on a side. The outline shape of the element, as is shown in FIG. 4, may be triangular, as at 20, square as at 23, or hexagonal as at 25. The three shapes of the elements as shown in FIG. 4, as well as others, for example, the rectangle or the octagon, or other shapes and combinations also may be employed, but preferably the shape chosen should be a regular geometric figure which can be combined with other similar figures without permitting a gap to exist between adjacent sides of such figures. FIG. 5 illustrates how a number of triangular ruled masters 21 can be arranged into a cluster 22. Similarly a number of square ruled masters 27 and hexagonal masters 29 can be positioned to form clusters 24 and 26 resectively.

Each element such as 20 is chosen of a thickness such that it remains rigid during the removal of metal while undergoing generation of the ruled master and during subsequent electro-forming processes. The element preferably is of aluminum or electro-deposited copper.

Ruling machines used in forming scribing grooves to provide a ruled master to make a tool for cube-corner sheeting are well known in the art. Such machines are capable of positioning the workpiece and a cutter within the optical tolerances necessary to scribe the grooves to optical requirements including proper depth, angle, spacing and a mirror finish. Typical groove spacings to form cube-corner type reflector elements range from 0.006" to 0.012", with a depth ranging approximately from .003 to 0.0065 inches.

As used herein, the phrases "cube-corner", or "trihedral" or "tetrahedron" are art recognized terms for retroreflective elements comprising three mutually perpendicular faces, without reference to the size or shape of the faces or the position of the optical axis of the cube-corner element so formed. Stamm U.S. Pat. No. 3,712,706 discloses various scientific principles and techniques for ruling a master.

The ruling device must be such that a groove uniform in angle and depth is created along its entire length, and that each successive groove also is properly spaced and uniform. The ruling device can be of the type where the cutter is moved while the workpiece remains stationary or, conversely, the workpiece is moved with respect to a stationary, usually a diamond tipped cutter. Further, the ruling device must be capable of accurately indexing to the second and third or more cutting positions different from the initial set of grooves.

Figure 3:
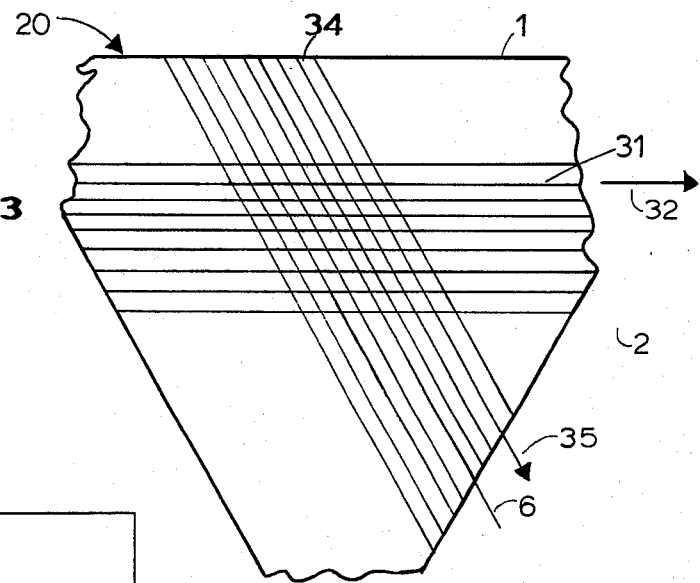
FIG. 3 is a fragmentary top plan view of a partially completed master.
Figure 7:
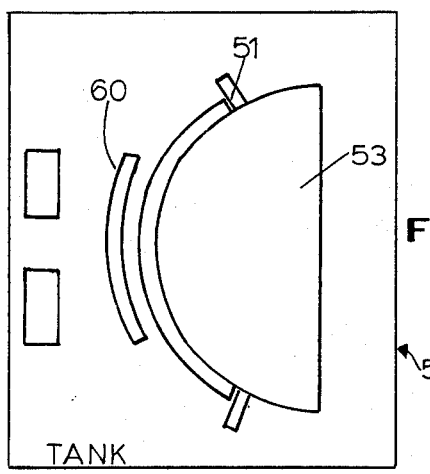
FIG. 7 is a schematic representation of the technique employed to create semi-cylindrical segments according to the present invention.

The element 20 for the ruled master 21 of FIG. 3 is positioned upon a workpiece support of an appropriate ruling device (schematically at "A" in FIG. 1) and the cutter thereof set to cut a first series of parallel grooves 31, arbitrarily selected, along the axis in the direction of the arrow 32. The cutter has a V-shaped cutting edge of desired pitch and depth.

In accordance with one aspect of the invention, before cutting of the second set of grooves 34, the first set of grooves 31 is filled along the axis 32 with a material of appropriate hardness and machinability to allow a second set of grooves 34 to be cut without interruption, as if the first set of grooves 31 did not exist. This allows the material being removed during cutting to be pushed directly ahead of the cutter instead of into the first set of grooves at each groove intersection, and thereby possibly distorting the intersections. The fill also serves to support the faces of the tetrahedral elements being created and prevents their distortion. Epoxy or curable polyesters can be used as the fill materials. As noted, a second set of grooves 34 is then cut along the axis in the direction of the arrow 35. The remaining fill material (i.e., that portion not at the intersections of the second grooves 34 with the first grooves 31) then is removed. Fill material then is applied to both sets of grooves 31 and 34 prior to the cutting of a third set of grooves. The element 20 (or tool) is then indexed to proper position to cut a third set of grooves. When the cutting of the third set of grooves is complete, all of the fill material is removed and the ruled master 21 is ready for the next step. One suitable material is a casting polyester known as Decra-Coat manufactured by Resco. A suitable epoxy is Hardman No. 8173.

Figure 1A:
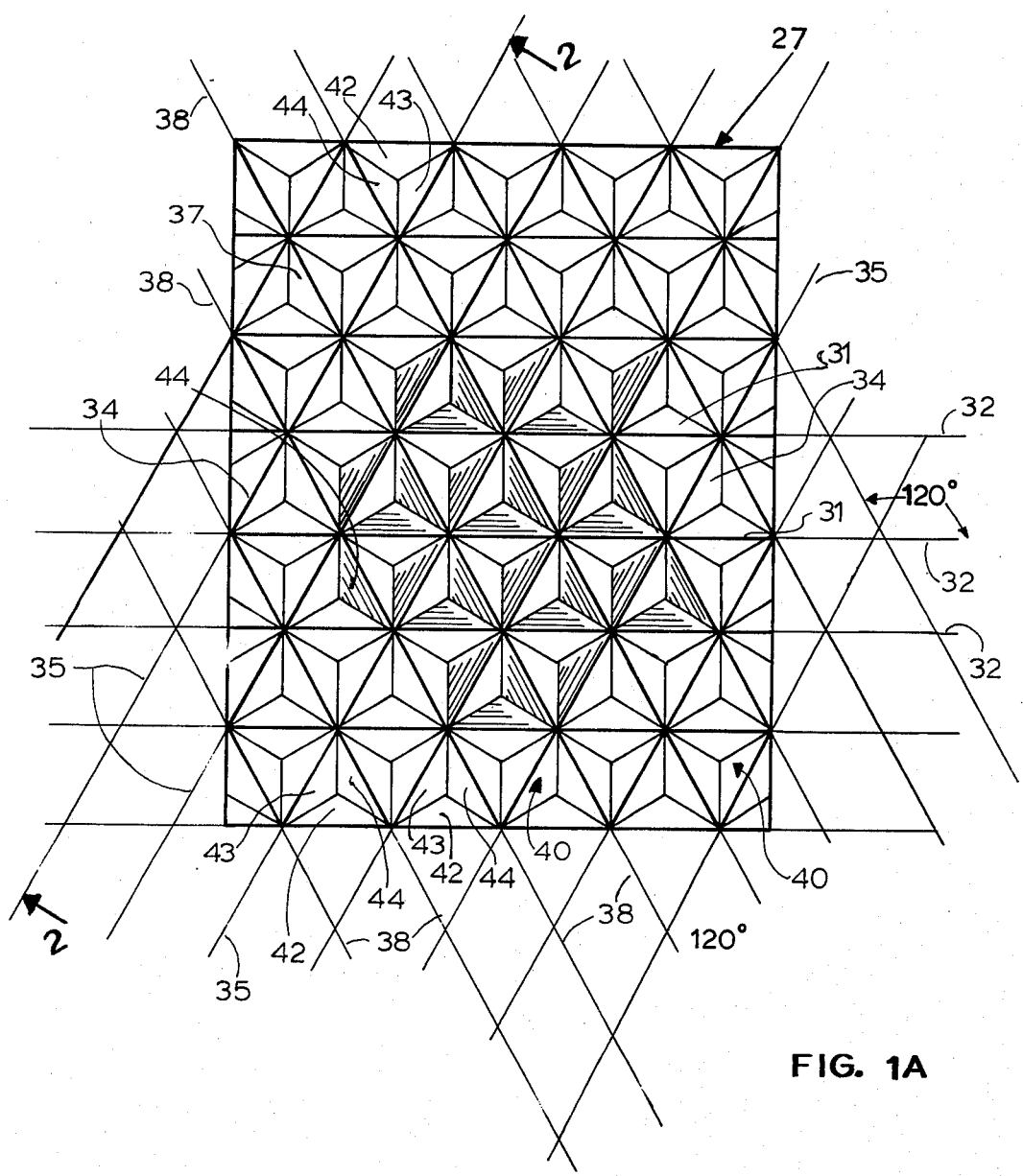
FIG. 1A is a partial top plan view of a completed master for producing an embossing tool for embossing cube-corner sheeting, in which the master is prepared according to the method of the invention.
Figure 2:
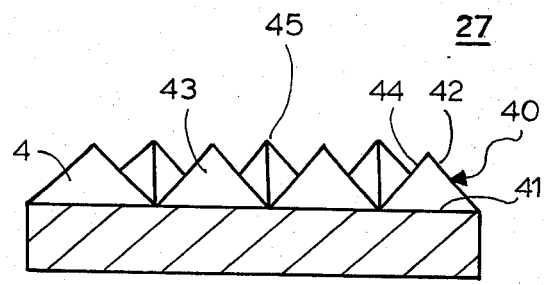
FIG. 2 is an elevational view of the master of FIG. 1A, partly in section, taken along the line 2—2 in FIG. 1A.

FIGS. 1A and 2 show a complete ruled master 27 having a square configuration. A first set of grooves 31 was cut along the axes 32, followed by a second set 34 along the axes 35 and a third set of grooves 37 along the axes 38. The intersections of the three grooves creates a base 41 for each of the tetrahedrons or cube-corner elements 40, while the pitch of the cutting tool determines the slope of the three mutually perpendicular faces 42, 43 and 44 of the cube corner elements 40. The intersection of the planes of the faces 42, 43 and 44 is the apex 45 of the tetrahedron 40.

The ruling devices presently available to cut masters to the optical accuracy required for cube-corner retro-reflectors are not capable of cutting a single master large enough to be used directly to emboss a web of the desired width and of a length large enough to permit efficient operation. Accordingly, the master such as 21 or 27 must be used to produce copies which can be grouped together to form larger areas until a tool of the desired dimensions is created. Two options are possible at this stage.

In the first approach, a number of ruled masters 21 (which may or not be identical) are produced and then are arranged in a cluster such as 22, 24 or 26, and assembled in a fixture as at 49 (see FIG. 6), and a thick nickel electroform solid copy is made by techniques known to those in the electroforming arts. By the selective shielding of the solid copies, the deposited nickel can be controlled to produce a solid copy without interfaces and of uniform thickness throughout. This solid copy then can be used to generate additional copies needed for the next step, and the clusters 22 can be disassembled and used for other configurations. The first solid copy then will be a female having been formed from a number of the male masters 21.

A second approach employs a single master 21 which is used to generate a mother copy 19 (FIG. 1) which then is replicated to generate a number of electro-deposited nickel copies 28 (shown at C on FIG. 1) and the copies 28 of the master 21 then are arranged in a cluster 22 and assembled into a fixture 49. A solid copy then is made from the clustered copies of the ruled master 21 (steps D, E, F in FIG. 1). Two successive electroform steps are performed so that strip 50 of male cube corner elements corresponding exactly to the ruled master 21 is produced. As noted, the solid copies 28 are used to generate the thin electroform copy or strip 50. The thin strip 50 is then employed to form a plurality of strips 51 of female cube-corner elements as shown as H, I and J of FIG. 1. The strips 51 are then ground on their rear surfaces to a specific thickness to provide the desired flexibility whereby the strips 51 can be formed about an appropriate mandrel 53 (FIG. 1, step K) for succeeding steps. For example, four strips 51, each approximately 5 inches in width and 18 inches long, may be produced from the solid copies 28 and arranged about a cylindrical mandrel 53 so as to provide a cylindrical segment copy 55 (FIG. 1 step M) which is 20 inches wide and 18 inches long. Three cylindrical segment copies 55 then are employed to produce a final embossing tool which is 20 inches wide and approximately 54 inches in circumference. Larger strips and more numerous strips 51 will be used to produce larger tools.

Figure 12:
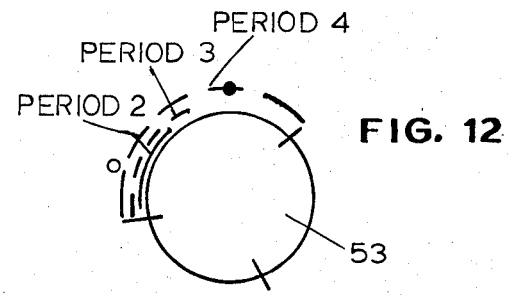
FIG. 12 is a representational plan view of a tank and shield demonstrating expansion of the shield's position during electroforming of the cylindrical tool master.

FIGS. 7 to 11 (and steps J–M of FIG. 1) show the method by which the segment copies 55 are generated. Each cylindrical segment copy 55 is about ⅓ of the circumference of the final mother tool for generating the embossing tool. However, different sized segments could be made for specific applications, such as ¼ segments or the like. The segment copy 55 could be made thin and bent into its desired shape by an outer support or it could be produced as a relatively thick member formed in its desired shape in order to retain the optical accuracy and provide strength for later operations. In the latter approach, the female strips 51 are placed about mandrel 53 and both mandrel 53 and strips 51 are placed in the electrodeposition tank 57 (see step L of FIG. 1) adjacent the nickel anodes 61. In such position, the central portion of strips 51 are closer to the anodes 61 than are the ends of strips 51. As a result such ends will be plated to a lesser degree, giving the cylindrical segment copy 55 little strength at its ends. To obviate this problem, a shield 60 (FIG. 7) of nonconductive material (e.g. plastic), is placed between the nickel anodes 61, and the assembled strips 51 on the mandrel 53. The position and width of the shield 60 is controlled so that at the final stages of the electro-deposition most of the nickel ions are directed to the strip ends to increase the thickness of the deposited nickel thereat. FIGS. 8 to 11 show the successive positions of the shield 60 during plating. In FIGS. 8–11, the mandrel 53 is rotated on a vertical axis for representational purposes. The strips 51 are positioned on the mandrel 51 initially and no shield is employed as shown in FIG. 8. The anodes 61 have been omitted from FIGS. 8–11 for the sale of clarity. The anodes 61 normally would be aligned with the strips 51 and exist above the plane of the paper. With such an arrangement, the greatest nickel build up would be about the central portion of the strips 51. As the electro-deposition progresses, it is desirable to direct more and more of the nickel ions toward the strip ends. Accordingly, the shield 60 is placed over the central portion of the strips 51, as is shown in FIG. 9. The shield 60 is supported by two support rods 62 and 63, which also define the extent of the shield 60. Since the nickel ions do not pass through the shield 60, they travel towards the ends of the strips 51 which are furthest away from the electrodes, to build up the thickness of the electro-deposition in such areas. FIGS. 10 and 11 show the further extent of the shield 60. A diagrammatic representation of the shield 60 on successive time periods 2, 3 and 4 is illustrated in plan view in FIG. 12. During period 1, the strip 51 is fully exposed (no shield).

When completed, the segment copies 55 (FIG. 1) with their precision patterns on the inside, and each comprising ⅛ of the circumference of a final cylinder, are placed within fixtures (not shown) for support to define a segment cylinder 65 (FIG. 14). Using the assembled segment cylinder 65 as the negative electrode with an accurately positioned nickel anode in the center of the cylinder 65, the segment cylinder 65 will be plated on its inside diameter to generate a thin flexible but solid seamless master cylinder 70 having flash or fins which can be ground off so no stress risers are transferred to the next part. This cylinder then could be used as a model to produce similar cylinders without repeating all of the previous steps (steps A-N in FIG. 1). The segment cylinder 65 then is disassembled into the segment copies 55, leaving the tool master cylinder 70.

The master cylinder 70 now consists of female cubes which are situated on the outside diameter. This cylinder 70 is identical in configuration to that which is required as an embossing tool, however, tools produced by this method (using several segments 55 joined together as a mandrel) have a number of disadvantages. They require an intricate assembly and disassembly of the segment fixture which requires precision alignment. Also of concern is the interface between the thin segments 55 which contain extremely small fissures. Although this discontinuity is almost non-detectable, it causes a difference in the crystalline structure of the metal deposited over it. This change results in stress-risers which become lineal imperfections causing early fatigue failures in parts that will be flexed during embossing.

These problems of assembly and metallurgy are avoided by the present invention. The tool master cylinder 70 will have surface imperfections such as flash, due to the fissures in the mother fixture, removed by grinding. Once this flash is removed, subsequent copies made from such part will not contain stress risers or alterations in the metallurgical structure, although this cylinder 70, when used as a mandrel does have these imperfections.

With proper fixturing (not shown), the tool master cylinder 70 then is rotated during subsequent electroforming, with nickel anodes adjacent its outer surface to form a thick electroform mother cylinder 75, on the order of 0.050" to 0.100", as compared to the tool master cylinder 70 which is of a thickness of only 0.010" to 0.030".

The thick mother cylinder 75 then becomes the negative of a cylindrical embossing tool 80. Both mother cylinder 75 and the cylindrical embossing tool 80 formed on the inner surface thereof are continuous and seamless.

Figure 16:
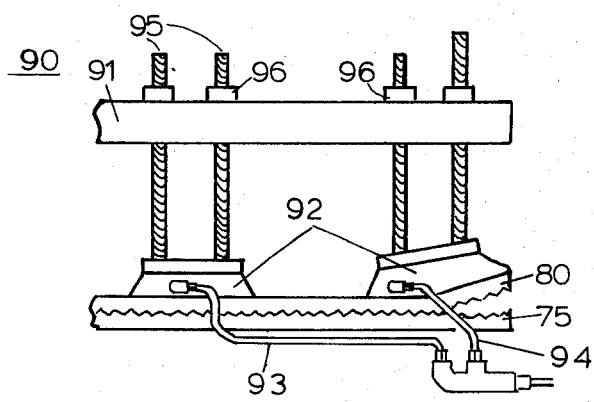
FIG. 16 is a side view of the tool in FIG. 15.
Figure 17:
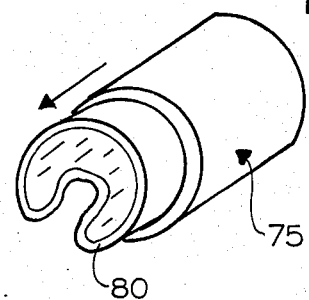
FIG. 17 is a diagrammatic representation of a collapsed cylindrical tool prior to removal from its mother.

The present invention utilizes a novel method to separate the seamless embossing tool 80 from the mother cylinder 75, without damage to either. Normal "sweating" techniques (expanding one cylinder and contracting the other by temperature differential), cannot be employed because of the depth of the male cubes plated into the female counterparts. To provide separation, the inner cylinder is fixtured with a vacuum apparatus 90 (FIGS. 15-17). The vacuum apparatus 90 consists of a tube 91 to which is affixed several hollow suction cups 92. Independently controlled hoses 93 and 94 are affixed one to each cup 92 (see FIG. 16) to create a vacuum. Each cup 92 is secured to the tube 91 by threaded rods 95 and nuts 96. Mechanically raising cup 92 by rotating one nut 96 at one end of one cup, causes the cup to lift the underlying cylindrical tool 80 from the mother 75. This then lifts a portion of the thin and flexible inner tool cylinder 80 away from the rigid outer cylinder 75. Normally, the negative effect of a vacuum in this direction would be cancelled by the intimate contact of the two parts and not allow separation. In this case, the breaking force is initially applied mechanically at the very edges of the cylinders which allows air to enter between the two cylinders. Once the edges are separated, the additional cup or cups 92 that run along the line of separation are mechanically adjusted to continue to apply the vertical vacuum force along a wider path, stripping the inner tool part 80 along this line (FIG. 16). Once the length of the cylinder 80 has been separated along this line, the ends of the inner tool cylinder 80 can be held up mechanically or manually and the vacuum apparatus 90 removed. The thickness of the tool 80 (about 0.010" to 0.030")permits it to flex without damage to the cube corner elements.

The inner cylinder 80 then is totally collapsed, (FIG. 17), either manually or by mechanical means. At this point, a thin protective film such as Mylar is positioned between the two cylinders 75 and 80 to insure removal without damaging either surface.

The inner tool cylinder 80 then is pulled clear from the outer cylinder 75 and recovers its shape.

Once removed, the heavy mother cylinder 75 can continue to be used to produce similar embossing tools 80 at a rate of 12 to 48 hours per copy, depending on the plating rate used.

The process disclosed herein can be varied along the various steps if a smaller embossing tool is required or extended if a larger tool is desired. Although the tool 80 is described as a cylinder during its production, because of its ability to flex, it may be employed in other forms. For example, it may be used as a belt having two long sides with short curved ends where it passes over drive rollers (step T of FIG. 1).

It will be understood that while the present invention describes the making of a cylindrical tool for embossing cube corner sheeting, the principles of the invention are applicable to any type of tool in which accuracy of the embossed surfaces are desired for a specific reason, and the noted technique for separation of the cylindrical tool from its mother is applicable to any cylindrical parts formed with an interfering pattern that prevents "sweating" or other simple separation of two seamless cylinders.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

What is claimed is:

1. A method of making a thin flexible seamless generally cylindrical embossing tool for continuous embossing of a web of material with an optically precise pattern having sharp angles and flatness of faces in certain detail, comprising the steps of forming at least one master element to the precision optical pattern required;

assembling a contiguous cluster of master elements, at least one of which has the pattern therein;

replicating the assembled cluster to provide a number of flexible strips of contiguous pattern;

assembling said strips on a cylindrical mandrel and replicating such assembled strips to provide cylindrical segments;

assembling such segments to provide a cylinder of the desired dimensions corresponding to the width of web to be embossed;

replicating such cylinder to provide a seamless master cylinder;

replicating said master cylinder to produce a relatively thick seamless and metallurgically uniform mother cylinder;

replicating said mother cylinder to produce a relatively thin, seamless, flexible, and generally cylindrical metal embossing tool having the precision optical pattern therein.

2. The method set forth in claim 1, wherein the precise optical pattern comprises an array of cube-corner type elements.

3. The method as set forth in claim 2, wherein said cube-corner elements are formed in said master element by scribing said master element with offset grooves thereby to provide male tetrahedrons on said master element.

4. The method set forth in claim 3, wherein parallel ones of said grooves are located between 0.006" and 0.012" to adjacent grooves.

5. The method set forth in claim 3 wherein the base of each of said cube-corner elements comprises an isosceles triangle.

6. The method set forth in claim 1, and including the step of lifting one edge of said flexible tool cylinder away from the mother cylinder and then continuing to collapse said tool cylinder from the mother cylinder to permit removal of said tool cylinder.

7. The method set forth in claim 1, wherein said flexible embossing tool is between 0.010" and 0.030" in thickness.

8. A method of preparing a ruled master with a precise optical pattern consisting of more than one ruled line, from a metal element having at least one planar surface, such master to be used in the production of embossing tools, comprising the steps of forming a first groove in a planar surface of a metal element; filling said first groove with a synthetic material of appropriate hardness and machinability and permitting said material to cure; positioning said metal element to a second position offset from said first position; forming a second groove in said planar surface of said metal element, said second groove intersecting said first groove, and thereafter removing said fill material from the remainder of said first groove.

9. The method of claim 8, further comprising the additional steps of filling both said first and said second grooves with a synthetic material of appropriate hardness and machinability and permitting said material to cure; positioning said metal element to a third position; forming a third groove in said planar surface of said metal element, said third groove intersecting said first and said second grooves; and thereafter removing said fill material from the remainder of said first and second grooves.

10. The method of claim 9, wherein said first, second and third grooves are formed by cutting into said planar surface with a cutting tool having a triangular cross section whereby the land between said first, second and third grooves is in the shape of an equilateral triangle.

11. The method of claim 9, wherein said first, second and third grooves are formed by cutting into said planar surface with a cutting tool having a v-shaped cross section whereby the land between said first, second and third grooves is in the shape of an isosceles triangle.

12. A method of preparing a ruled master from a metal element, having at least one planar surface, to be used in the production of embossing tools comprising the steps of: forming a first series of uniformly spaced grooves in a planar surface of a metal blank; filling said first series of grooves with a synthetic material of appropriate hardness and machinability and permitting said material to cure; rotating said element to a position offset from said first series of grooves; forming a second series of uniformly spaced grooves in said planar surface of said metal blank, said second series of grooves intersecting said first series of grooves; and removing said fill material from the remainder of said first series of grooves.

13. The method of claim 12, further comprising the steps of: filling both said first and second series of grooves with a material of appropriate hardness and machinability and permitting said material to cure; rotating said element to a third position offset from said first and second series of grooves; forming a third series of uniformly spaced grooves in said planar surface of said metal blank, said third grooves intersecting said first and second series of grooves; and removing said fill material from the remainder of said first and said second series of grooves.

14. The method of claim 13, wherein said first, said second and said third series of grooves are formed by cutting into said planar surface of said metal blank with a cutting tool having a v-shaped cross-section whereby the lands defined by said first, said second and said third series of grooves produce a tetrahedron.

15. The method set forth in claims 8 or 12, wherein said fill material comprises a casting polyester.

16. The method set forth in claim 8 or 12, wherein said fill material comprises an epoxy.

17. A method of separating a thin, continuous flexible metal electroform from within a substrate upon which it is formed wherein said substrate and said electroform have relatively small and plural complementary engaging features providing fine detail and interfering relationships when formed which preclude rotational or axial movement relative to one another, comprising the steps of inserting a support within said substrate, said support having one or more selectively operable lifting devices thereon; operating said devices to grip the electroform on said substrate and to separate said electroform from said substrate; collapsing said flexible metal electroform inwardly; and removing said electroform completely from said substrate.

18. The method as set forth in claim 17, wherein said substrate and said electroform each comprise a cylinder.

19. The method set forth in claim 17, wherein one edge of said electroform is first separated from the corresponding edge of said substrate; said electroform is then separated along a line defined by the vacuum devices until one complete section of electroform is separated from edge to edge, and then said flexible electroform is collapsed to permit removal from said substrate cylinder.

20. A method of making a thin flexible seamless generally cylindrical embossing tool for continuous embossing of a web of material with an optically precise pattern, having sharp angles and flatness of faces in certain detail, comprising the steps of forming at least one master element to the precision optical pattern required;

assembling a contiguous cluster of master elements, at least one of which has the precision pattern therein;

replicating the assembled cluster to provide a number of flexible strips of contiguous pattern;

assembling said strips on a cylindrical mandrel and replicating such assembled strips to provide cylindrical segments;

assembling such segments to provide a cylinder of the desired dimensions corresponding to the width of web to be embossed;

replicating such cylinder to provide a thin, flexible seamless master cylinder having the precision optical pattern therein.

21. The method as set forth in claim 20, wherein at least a portion of said precision optical pattern comprises an array of cube corner elements, said cube-corner elements being formed in said master element by scribing said master element with offset grooves to provide male tetrahedrons on said master element.

22. The method set forth in claim 21 wherein the base of each of said cube-corner elements comprises an isosceles triangle.

23. The method set forth in claim 17, in which the lifting devices are vacuum operated.

* * * * *